C. SPECHT.
VEHICLE TIRE.
APPLICATION FILED AUG. 3, 1912.
1,097,596.
Patented May 19, 1914.
2 SHEETS—SHEET 1.
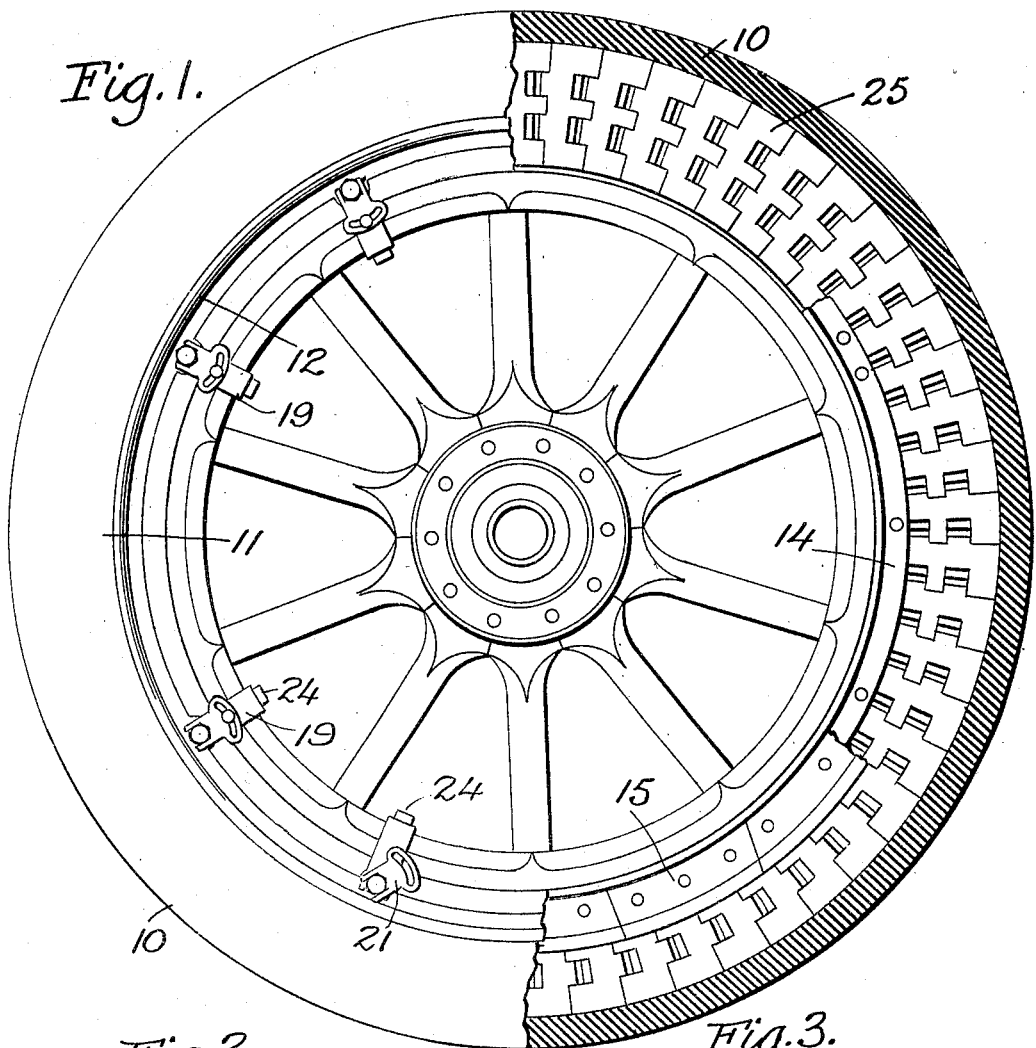
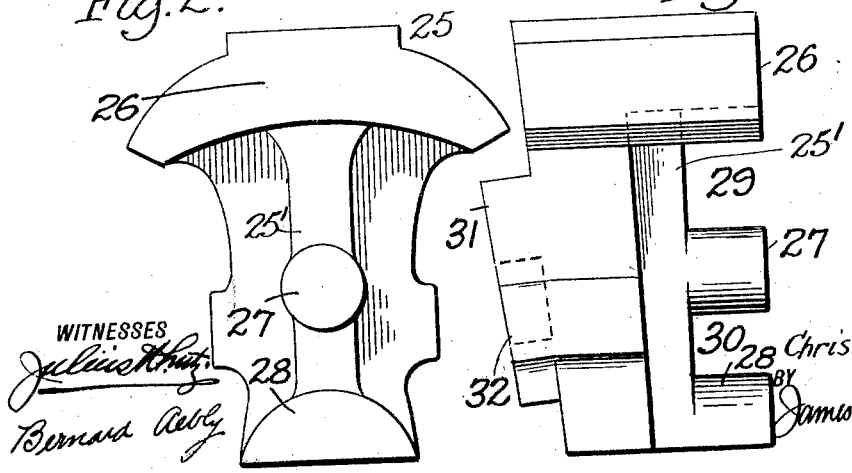
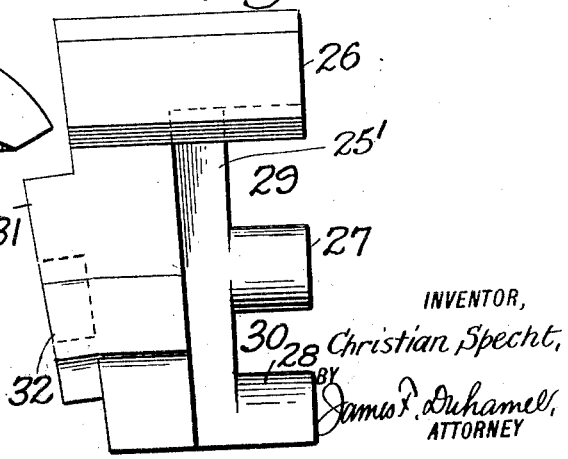
INVENTOR,
Christian Specht,
BY James F. Duhamel,
ATTORNEY C. SPECHT.
VEHICLE TIRE.
APPLICATION FILED AUG. 3, 1912.
1,097,596.
Patented May 19, 1914.
2 SHEETS—SHEET 2.
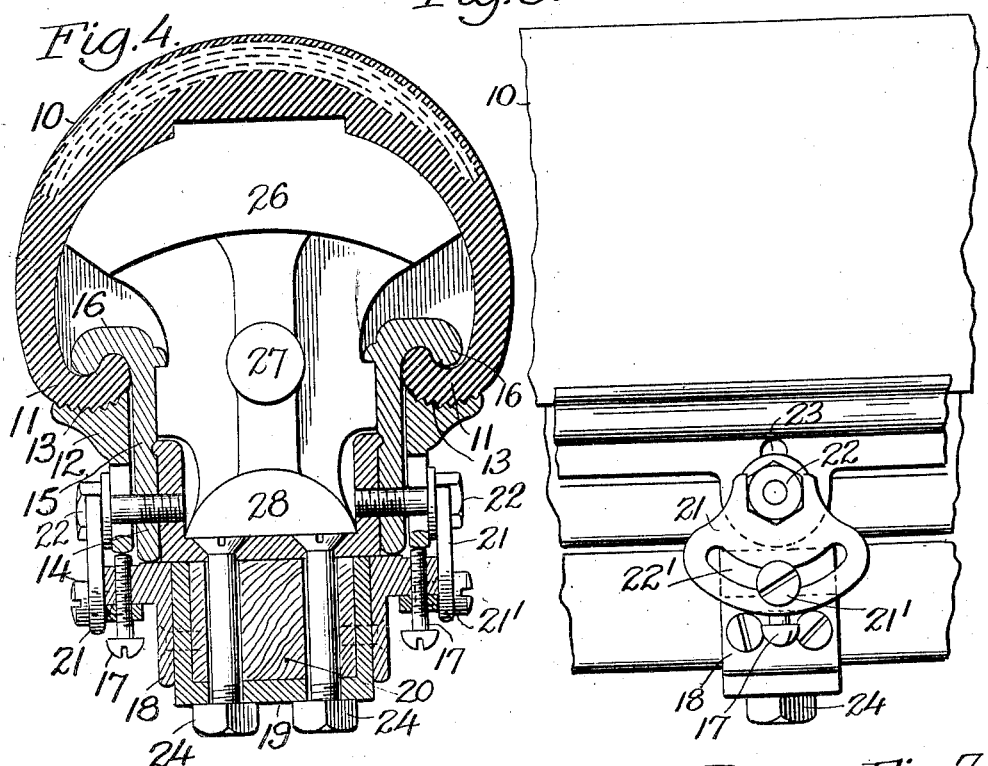
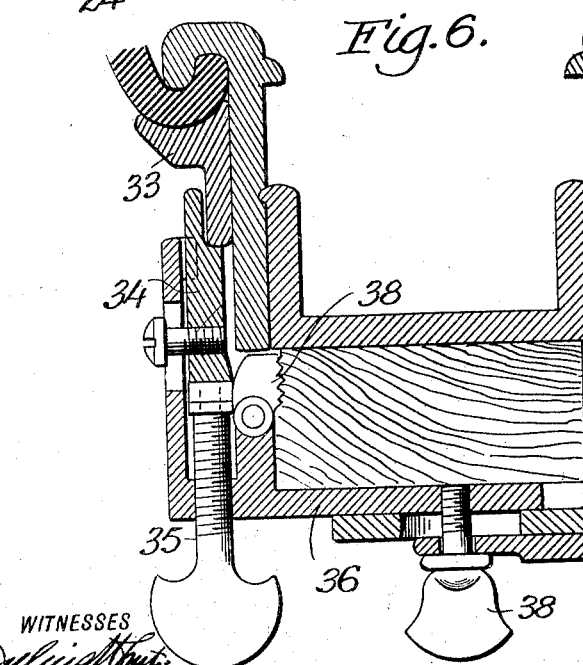
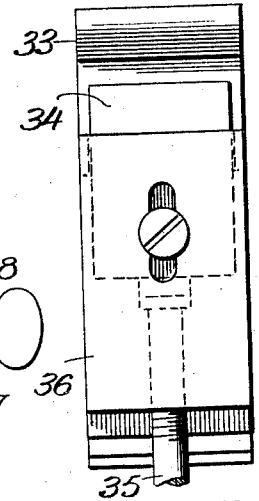
WITNESSES
Julius Hutz
Bernard Aebly
INVENTOR
Christian Specht,
BY James P. Duhamel
ATTORNEY

UNITED STATES PATENT OFFICE.

CHRISTIAN SPECHT, OF WOODHAVEN, NEW YORK.

VEHICLE-TIRE.

1,097,596. Specification of Letters Patent. Patented May 19, 1914.

Application filed August 3, 1912. Serial No. 713,017.

*To all whom it may concern:*

Be it known that I, CHRISTIAN SPECHT, a citizen of the United States, and resident of Woodhaven, in the county of Queens and State of New York, have invented certain new and useful Improvements in Vehicle-Tires, of which the following is a specification.

This invention relates to vehicle tires and has for its object certain new and novel features adapted to produce a resilient tire, which is not liable to become worthless from punctures or other injuries and comprises the usual outer tire or shoe, inclosing interlocking blocks of rubber or similar material, the shoe being clamped in place by rings secured to the rim of the wheel, as will be more fully described in the following specification set forth in the claims and illustrated in the drawings wherein:—

Figure 1 is a side elevation of the improved tire and the wheel partly in section. Fig. 2 is a front view of one of the rubber blocks. Fig. 3 is a side view of the same. Fig. 4 is a sectional view through the tire and wheel. Fig. 5 is a side detailed view of the tire on an enlarged scale. Fig. 6 is a sectional view of the modified construction. Fig. 7 is a side view of the same.

This tire is especially adapted for heavy work and is intended to overcome the serious objections to be found in pneumatic tires, where the wear and tear subject them to constant injury and destruction.

The present invention consists of the outer tube or shoe 10 which may be of rubber reinforced with canvas or other similar material and having plain ends 11 adapted to be gripped and held in place by means of rings 12 with corrugated edges 13. The rings 12 are secured to a metallic box 14 and work in conjunction with the inner rings 15, and heavy projecting jaws 16 into which the ends 11 of the shoe are forced and held by means of the rings 12. The latter rings are made in sections for convenience of adjustment and are forced against the ends of the shoe by means of screws 17 which play in brackets 18 secured to yokes 19 which are attached to the felly 20 of the wheel. These brackets also carry slotted locks 21 which prevent the heads 22 of bolts from turning after the section of the rings 12 have been adjusted by means of the screws 17; the bolts 22 passing through slots 23 so that the sections may be adjusted and finally permanently secured by means of the bolts. These bolts 22 also pass through the rings 15 and into the box 14 thus producing a solid construction. The box 14 and yoke 19 are secured to the rim 20 by means of the bolts 24.

Within the shoe 10 and box 14 are carried a number of blocks of rubber or resilient material 25. These blocks are rounded on their outer face to conform with the interior of the shoe and abundant space is left at each side for the play of the blocks when under compression. At the front end of the blocks are projections 26 and 27 and 28 forming recesses 29 and 30; at the other side of the blocks are extensions 31 which fit within the recesses 29 and 30 of the adjacent block, and the extensions each have a socket 32 into which the projection 27 fits, so that the blocks when arranged within the shoe interlock and are prevented from moving in any direction, yet are provided with sufficient space for resilient action.

When the parts of the tire are assembled, the shoe 10 is secured at one edge and the blocks are placed in position around the rim of the wheel. The shoe is then drawn around them and by means of a tool the other edge is forced within clamping rings 12 and 16 and secured therein.

In the modified forms, shown in Figs. 6 and 7, the sectional ring 33 is adjusted by means of plate 34 and screws 35; these parts being carried by the temporary frame 36, having an adjustable side 37 to lock it upon the rim of the wheel where it is clutched by means of the block 38. When the rings are adjusted and secured by means of bolts, the frame 36 is removed by releasing the screw 38.

It is obvious that certain details of construction are modified to adapt this tire for use to vehicles of different sizes but the above description covers the preferable form of tire for ordinary passenger carrying automobiles.

Each of the blocks 25 is provided with a rib 25' on its front face and its sides are cut away to afford abundant air space and space for compression when it is carrying its load. The lock 21 after being placed about the bolt head 22 is held rigidly in place by a set screw 21' and the lock may be shifted to hold the bolt head at any angle by means of the slot 22' through which the screw passes.

What I claim as new and desire to secure by Letters Patent is:

1. In a vehicle tire, the combination with the rim of a wheel, of a flexible tube secured thereto and having an interior groove and flexible interlocking blocks with a tongue to fit the groove partly filling the interior of the tube.

2. In a vehicle tire, the combination with the rim of a wheel, of a flexible tube secured to the rim and having an interior groove, and flexible blocks having tongues to fit the groove and recesses on one side and extensions on the other partly fitting the interior of the tube.

3. In a vehicle tire, the combination with the rim of a wheel, of a flexible tube with edges to be attached to the rim and having a groove on the under side of its tread, flexible blocks having tongues fitting the groove and interposed between the inside of the tread and the rim of the wheel, and extensions on one side of the blocks to fit in recesses on the other side of the adjacent block.

Signed at New York in the county of New York and State of New York this eighth day of July A. D. 1912.

CHRISTIAN SPECHT.

Witnesses:
 ALFRED HÜTTLINGER,
 JAMES F. DUHAMEL.

---

Copies of this patent may be obtained for five cents each, by addressing the "Commissioner of Patents, Washington, D. C."